DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 7

T903,014
LASER PROCESS OF PRINTING TABLETS AND CAPSULES

Robert E. Dempski, 1629 Arran Way, Dresher, Pa. 19025

Filed Oct. 7, 1971, Ser. No. 187,576
Int. Cl. B23k *27/00*
U.S. Cl. 219—121 LM
No Drawing. 3 Pages Specification

A laser is used for printing indicia on solid pharmaceutical dosage forms. The process involves scanning a laser beam, which is focussed and modulated to produce a desired image, over tablets or capsules in order to write or print a coding word or symbol. The laser energy acting on the surface of the tablet or capsule forms the desired image.